March 16, 1948.　　　　G. E. KING　　　　2,438,010
ELECTRIC MOTOR CONTROL SYSTEM
Filed Nov. 16, 1944　　　　2 Sheets-Sheet 1

WITNESSES:
E. A. McCloskey
E. H. Oberheim

INVENTOR
George E. King.
BY
Paul E. Friedemann
ATTORNEY

March 16, 1948.                 G. E. KING                    2,438,010
                     ELECTRIC MOTOR CONTROL SYSTEM
                     Filed Nov. 16, 1944          2 Sheets-Sheet 2
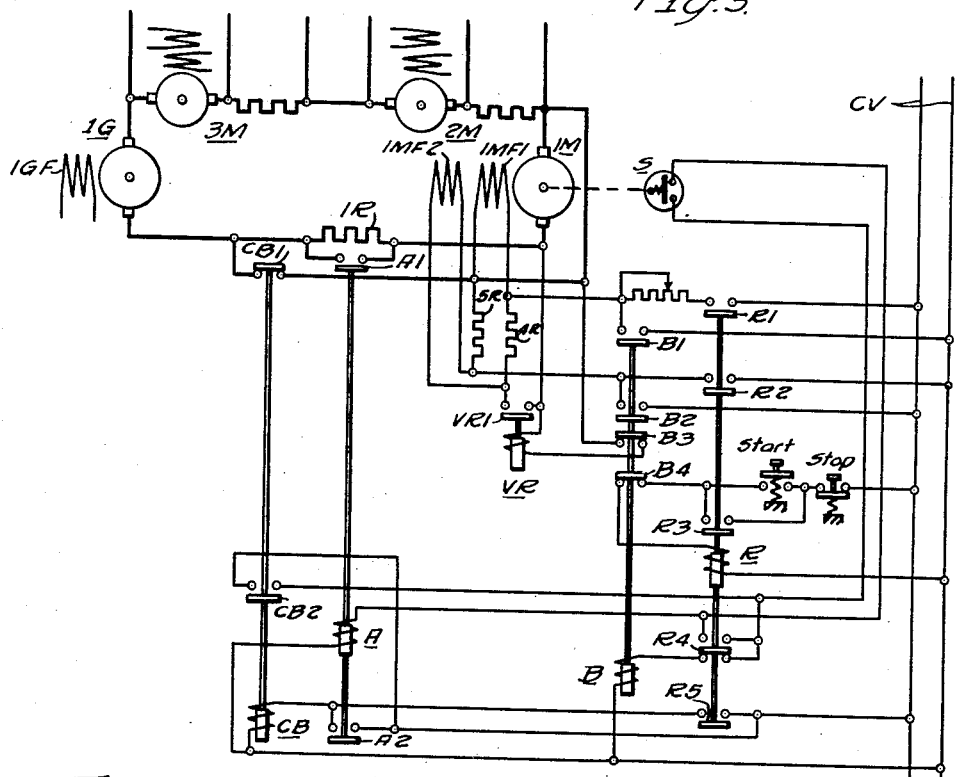
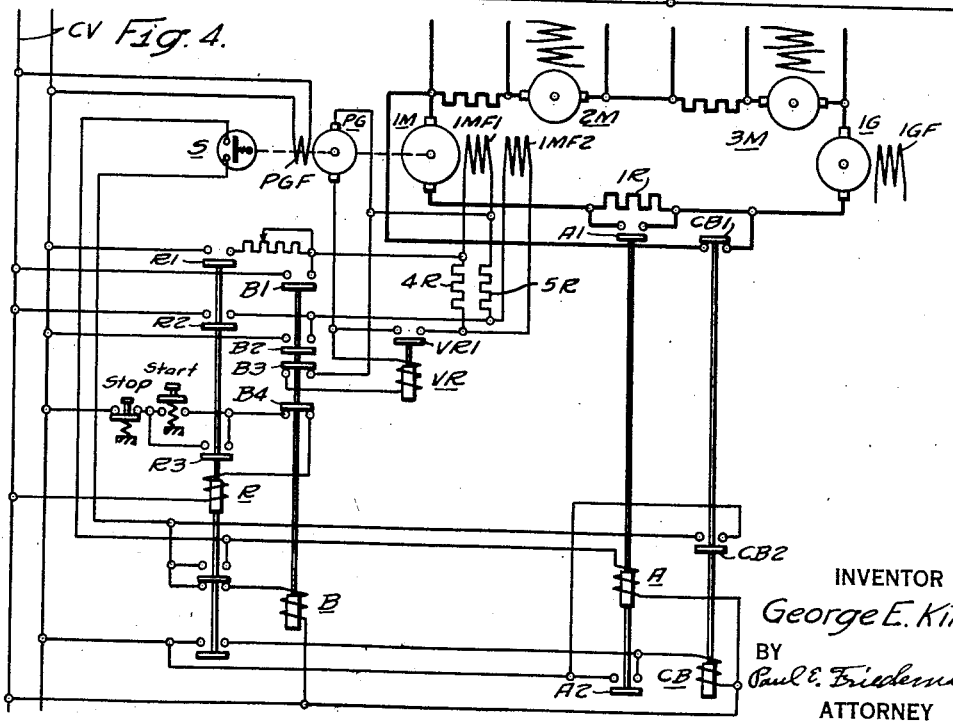
INVENTOR
George E. King.
BY
Paul E. Friedemann
ATTORNEY Patented Mar. 16, 1948

2,438,010

UNITED STATES PATENT OFFICE 2,438,010

ELECTRIC MOTOR CONTROL SYSTEM

George E. King, Swissvale, Pa., assignor to Westinghouse Electric Corporation, East Pittsburgh, Pa., a corporation of Pennsylvania Application November 16, 1944, Serial No. 563,754

5 Claims. (Cl. 318—270)

This invention relates, generally, to constant current electric drives and, more particularly, to a constant current electric drive which embodies a plurality of driving motors in which the armature currents of the motors are maintained at a constant value by means of a specially designed generator or a generator with a constant current regulator.

The invention as hereinafter disclosed is particularly adapted for operating a number of motors which drive sugar centrifugals. However, it will be understood that the invention may be utilized otherwise, for example, in cargo winches, towing winches, etc.

With constant current systems used to drive a motor of sugar centrifugal motors, it is possible to operate these motors such that some may be starting, some running, and some braking at the same instant of time. Thus, the motors which are braking may regenerate into the constant current system, and provide additional energy for operating the motors which are accelerating without producing an additional burden upon the constant current generator. The systems of control hereinafter disclosed, in general, provide constant torque acceleration and braking of the motors with provision for operating the motors at any selected speed within the capacity of the system and maintaining this speed constant once the motor has accelerated to the desired speed.

A principal object of this invention is to provide an electric drive which is simple in its elements and in its operation.

Another object of this invention is to provide an electric drive which includes provisions for obtaining constant torque acceleration and braking of the motor.

Still another object of the invention is to provide an electric drive in which certain electrical characteristics of the motor are utilized to effect a control of the motor.

A further object of the invention is to provide an electric drive which includes provisions for obtaining constant torque acceleration and braking of the motor and constant speed regulation at a selected motor speed.

Figure 1:
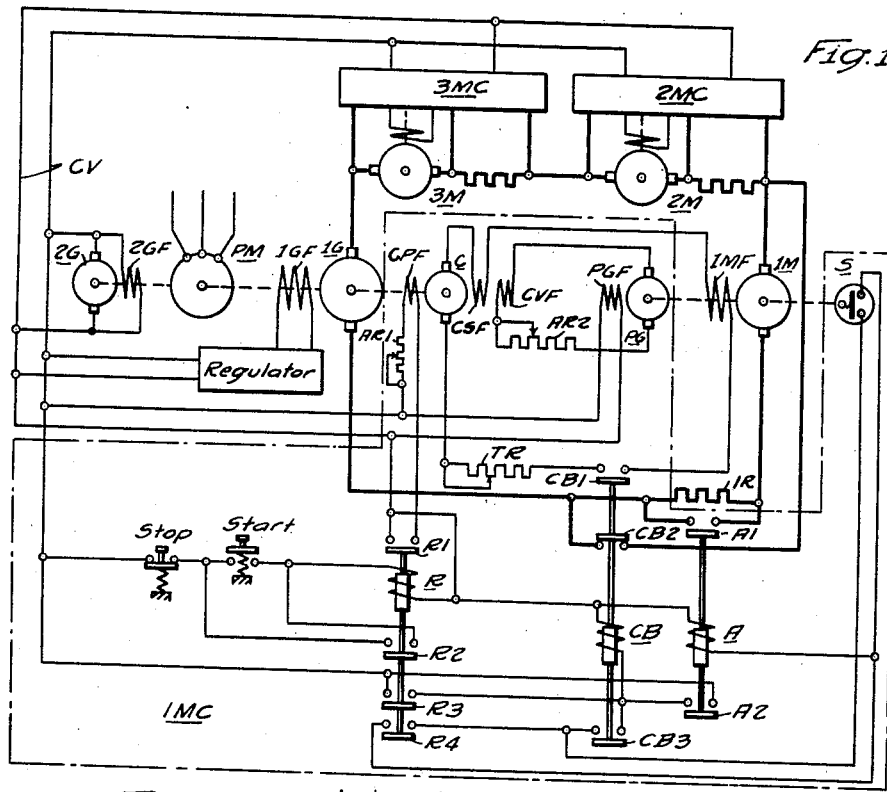
Figure 2:
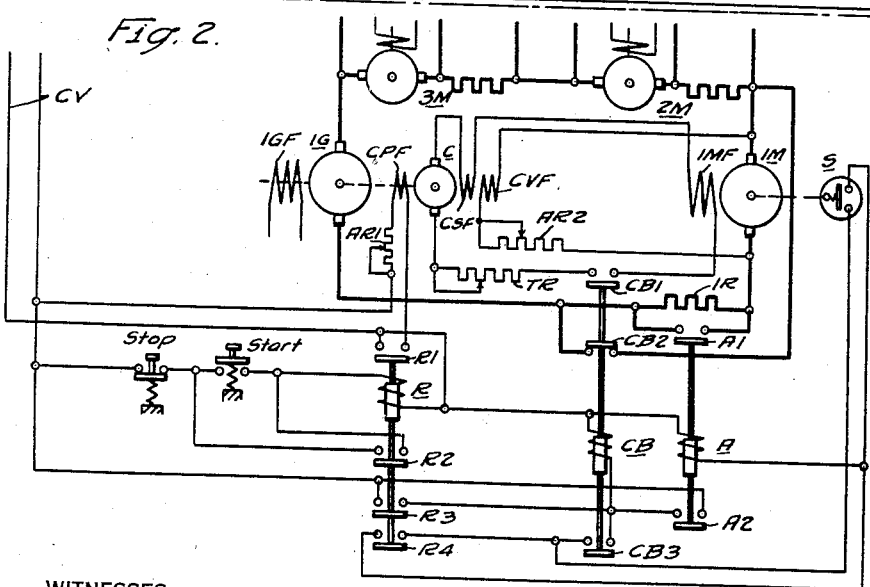

Other objects and advantages will become apparent from a study of the following disclosure when considered in conjunction with the accompanying drawings, in which:

Figure 1 schematically illustrates a constant current electric drive embodying the fundamental principles of this invention;

Fig. 2 is a modification of the invention illustrated in Fig. 1;

Fig. 3 schematically illustrates an electric drive providing a modified form of speed regulating equipment;

Fig. 4 is a modification of the invention illustrated in Fig. 3; and

Figure 5:
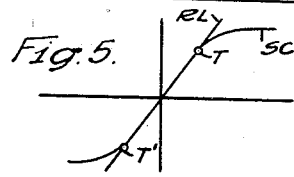

Fig. 5 graphically illustrates the operating characteristics of the control generator illustrated in Figs. 1 and 2.

Referring now to Fig. 1 of the drawings, the electric drive illustrated therein comprises, generally, a group of drive motors designated as 1M to 3M, inclusive, a constant current generator 1G for energizing the armature windings of the drive motors, a constant voltage generator 2G for supplying a constant voltage to certain elements of the control system and a prime mover PM for driving the generators. So much of the drive is common to these motors. Additional control elements for the motor 1M are bracketed in the dot-dash outline and designated generally 1MC. Similar control elements for the motors 2M and 3M are comprised in the blocks 2MC and 3MC but in the interest of simplicity are not detailed.

The control elements 1MC include a control generator C driven by prime mover PM for regulating the motor field winding 1MF and a pilot generator PG driven by the drive motor 1M. Suitable magnetic controllers, of which the one designated A is the accelerating relay, the one designated CB is the circuit breaker, and the one designated R is the run relay, are included in the control to effect the desired control over the system elements to which they are connected. The speed responsive switch S introduces a speed control in the system. The control elements thus far described and generally designated 1MC are utilized only to control the operation of the driving motor 1M. As previously noted the control elements for the driving motors 2M and 3M are respectively designated 2MC and 3MC, and for the purpose of simplifying the illustration of this invention are shown only in block diagram. It will be understood in this connection that the control systems 2MC and 3MC include operating elements such as those indicated in 1MC. The prime mover PM, however, may be utilized to drive the control generator such as C of each of these systems.

The balance of the description relating to Fig. 1 will be described in connection with the control system relating to drive motor 1M. In this connection, the function of the control systems 2MC and 3MC will be understood.

The armature winding of the motor 1M is connected in a series loop with the armature winding of the constant current generator 1G and a starting resistor 1R is connected in this series loop. The constant current generator may be any suitable type, since, per se, it forms no part of this invention. As illustrated, it is provided with a single field winding 1GF which is controlled by the output of the "Regulator" so designated in the drawings. This regulator for the operating characteristics desired will so regulate the excitation of the single field winding that the armature currents will be maintained at a constant level for any loading or speed of operation of the motor 1M. The single field winding 1MF for the drive motor is connected in a series loop with the series field CSF for the control generator C, the armature winding thereof and the adjustable resistor TR. It is thus energized according to the electrical output of the control generator C. The control generator C has special operating characteristics which will hereinafter be noted in detail. In addition to the series field winding CSF, the control generator is provided with a pattern field winding CPF which is energized according to the electrical output of the constant voltage generator, designated 2G. The excitation of this pattern field winding may be varied according to the setting of the adjustable resistor AR1 connected in series therewith to obtain variable operating characteristics of the motor. A voltage field winding CVF is also provided and is differentially connected with respect to the field winding CPF. The voltage field winding is adjustably energized depending upon the setting of the adjustable resistor AR2, by the output of the pilot generator PG which is mechanically driven by the drive motor 1M. The single field winding PGF for the pilot generator is energized according to the electrical output of the constant voltage generator 2G. Since the field excitation of the pilot generator is a constant value and its speed of rotation varies with the motor speed, its electrical output will vary according to the motor speed. Hence, the excitation of the voltage field winding CVF for the control generator varies according to the speed of the motor 1M. The constant voltage generator 2G, as shown, is provided with a single field winding 2GF which is shunt-connected. Any suitable field winding arrangement or control of the field winding arrangement of this generator may be utilized to obtain the desired constant voltage output.

The control generator C is of the self-energizing type. These characteristics are obtained by the use of the series-connected field winding CSF. Winding CSF may be shunt-connected if desired. The adjustable resistor TR is so adjusted in its resistance value that the resistance line of the series field or load circuit is tangent to the initial straight-line portion of the no-load saturation curve of this generator. These characteristics are illustrated graphically in Fig. 5 in which the saturation curve is designated SC, and the resistance line of the load circuit is designated RL. As will be seen from this figure, the resistance line is tangent to the initial portion of the curve as far as the points of tangency T and T'. This generator may thus have a voltage output equal to the ordinate of any of the points of tangency of the two curves. It thereby becomes the function of the voltage and pattern field windings of the control generator to select the proper operating point of this generator along the tangent curves, and to maintain this operating point substantially constant for the particular operating condition.

In this manner, when the pattern and voltage field windings of the control generator are equally energized, the total excitation resulting from these fields is zero, and the electrical output of the control generator at this point is maintained by the self-energizing properties of the machine. Should the voltage field winding CVF drop in its excitation due to a drop in the speed of operation of the motor M1, the pattern field excitation will predominate, and the excitation of this pattern field will be added to that of the self-energizing field to increase the electrical output of the control generator. The motor field winding 1MF is thus energized in a higher degree, thus the motor torque and consequently the motor speed are increased. When the speed of the motor increases sufficiently that the excitation of the voltage field winding is equal and opposed to that of the pattern field winding, the self-energizing properties of the regulating generator maintain the electrical output thereof at this new point. Any departure in speed of the motor at this new operating point will again produce a correction due to the differential action of the pattern and voltage field windings to bring the motor speed to its desired value.

Assuming that the constant current generator 1G and constant voltage generator 2G are both running at the constant speed controlled by the prime mover PM, the motor 1M can be started by pressing the start push button. This causes the relay R to close its contact members R1, thus connecting the control generator pattern field winding CPF across the constant voltage generator 2G. The contact members R2 shunt the start push button and thus maintain the energizing circuit for the coil of the relay R independent of the position of the start push button. The contact members R3 complete an energizing circuit for the coil of the circuit breaker CB also connected across the constant voltage generator. The contact members R4 partially establish an energizing circuit for the coil of the accelerating relay A. Since the coil of the circuit breaker CB is energized, this breaker closes its contact members CB1 to connect the motor field winding 1MF across the control generator C. The contact members CB2, which normally shunt the armature of the drive motor 1M and its series resistor 1R, thus effectively deenergizing the armature winding of this motor, now open, and the constant current output of the generator 1G circulates through the armature winding of the drive motor. The drive motor now accelerates with the resistor 1R in series therewith. The contact members CB3 in conjunction with the contact members R4 now closed complete the energizing circuit for the coil of the accelerating relay A. The accelerating relay A closes its contact members A1 to shunt the starting resistor 1R from its series connection with the armature winding of the drive motor. Its contact members A2 which parallel the contact members R3 provide an energizing circuit for the coil of the circuit breaker and also the accelerating relay A which is independent of the relay R. As the motor accelerates, the speed responsive switch S closes its contact members. These contact members shunt the contact members R4 and thus provide a parallel path for energizing the relay A which is independent of the relay R. This switch may be set to operate for both its closing and opening movements at fairly low speeds of the motor.

As the motor accelerates, the electrical output of the pilot generator increases, thus gradually reducing the net excitation of the control generator. During the early period of acceleration of the motor, the control generator may work well up on its saturation curve to thus maintain a substantially constant excitation of the motor field winding 1MF. Since the torque of the motor is proportional to the product of the field flux and the motor armature current, and both of these values during the accelerating period are maintained constant, the torque of the motor is constant. As the motor comes up to the speed selected by the setting of the adjustable rheostat AR1, the excitation of the voltage field approaches that of the pattern field and may become slightly greater than that of the pattern field. As a result, the operating point of the control generator is moved down along the tangent curves until a point is reached at which the motor field excitation is just sufficient to maintain the necessary driving torque for the motor. At this point the speed of the motor is maintained substantially constant by the action of the pattern and voltage fields of the control generator.

To stop the system, the stop push button is pressed. This deenergizes the relay R which immediately opens its contact members R1 to deenergize the pattern field winding CPF. The field excitation of the control generator is thus due to that of the voltage field. Since this field is reversed with respect to the pattern field, the electrical output of the control generator is reversed, and, consequently, the motor field winding 1MF is reversed in its excitation. The electrical output of the control generator now adjusts itself to some substantially constant value along the saturation curve, and thereby maintains the excitation of the motor field winding constant to provide a constant decelerating torque for the motor. As the motor decelerates towards zero speed the zero speed switch S opens. Since contact R4 is now open this deenergizes the accelerating relay A which opens its contacts A1 to insert the resistor 1R in the motor circuit and opens its contacts A2 to deenergize the circuit breaker CB. The contacts CB2 short the motor armature and the series resistor 1R from the constant current circuit and the contact members CB1 open the energizing circuit for the motor field 1MF thereby completely deenergizing the motor.

The embodiment of the invention illustrated in Fig. 2 of the drawings in fundamental principle is similar to that illustrated in Fig. 1. In an effort to simplify this illustration, the motor controls 2MC and 3MC as well as the prime mover and the constant voltage generator have been eliminated. Their function in the system, however, will be understood in connection with Fig. 1. The conductors connected to the constant voltage source as in Fig. 1 are designated CV. The control field winding for the constant current generator 1G, while not so illustrated, is again energized according to the output of a suitable regulator such as that illustrated in Fig. 1. The main difference of the invention of Fig. 2 over that of Fig. 1 resides in the elimination of the pilot generator PG. The voltage field winding and the adjustable resistor AR2 connected in series therewith are now connected across the motor armature terminals. The voltage field winding is thus energized by the counter voltage of the motor which varies substantially according to variations in the motor speed since the armature currents are for all practical purposes constant. An arrangement such as this is suitable in applications which do not require an extremely accurate control of the running speed of the motor. If the motor armature currents could be maintained absolutely constant, then the counter voltage would be an accurate indication of the motor speed. However, some slight variation in motor armature current will occur before the regulating equipment of the constant current generator can provide suitable corrections in the field excitation of this generator to correct the current change. As a result, some slight deviation of the motor counter voltage will occur as the result of the current change.

The system as illustrated in Fig. 2 being otherwise the same as that illustrated in Fig. 1, will be understood in connection with the description of Fig. 1.

The embodiment of the invention illustrated in Fig. 3 of the drawings provides a pair of field windings 1MF1 and 1MF2 for the drive motor M. These field windings are connected in opposite legs of a conventional electrical bridge circuit which has for its other two opposite legs the bridge balancing resistors 4R and 5R. Two of the terminals of the electrical bridge circuit are connected across the constant voltage conductors, designated CV, through the medium of either the contact members R1 and R2 for the run relay or the contact members B1 and B2 for the brake relay which reverse the connection of the constant voltage conductors to the bridge circuit with respect to the connections thereto established by the run relay R. The remaining two terminals of the bridge circuit are connected directly across the motor armature terminals. Here again the starting resistor in series with the drive motor armature is shunted by the contact members A1 of the accelerating relay, and the contact members CB2 shunt the motor armature and its series resistor from the constant current circuit. A voltage relay VR having the coil thereof connected in series with a contact member of the braking relay B across the motor armature terminals has its contact members VR1 connected in series in the circuit connecting the bridge circuit across the motor armature terminals. This voltage relay may be adjusted to pick up at some suitable motor counter voltage value, for example, that approaching the counter voltage value existing at normal running speed of the motor. With this arrangement during acceleration of the motor from zero speed up to the speed at which the voltage relay operates, the motor field windings are maintained at a constant value of excitation. Since the motor armature currents are constant, the motor is accelerated at a constant torque.

Assuming that the constant current and constant voltage generators are operating, pressing of the Start push button energizes the run relay R which at its contact members R1 and R2 connects the electrical bridge across the constant voltage conductors CV. At its contact members R5, the run relay energizes the coil of the circuit breaker CB. Its front contact members of the transfer contact R4 close and complete a partial energizing circuit for the coil of the accelerating relay A while its back contact members of the transfer contact R4 open and prevent the relay B from being energized. When the circuit breaker picks up, its contact members CB2 close, which, in conjunction with the front contact members of the transfer contact R4 of the run relay, energizes the accelerating relay A, thereby shunting the starting resistor IR at the contact members A1. An instant before this, however, its contact members CB1 opened and removed the shunt circuit around the motor armature and the starting resistor. Thus, for an instant, the motor accelerated from zero speed with the starting resistor in series therewith. As the counter voltage of the motor approaches the value at which the voltage relay picks up, the coil thereof is sufficiently energized to cause operation, and its contact members VR1 close to connect the remaining two terminals of the bridge circuit across the motor armature. The voltage thus connected across the bridge circuit is appled in opposition to that applied through the contacts R1 and R2 by the constant voltage conductors CV. As a result, the net excitation of the motor field winding decreases with a consequent drop in motor torque. This action continues until the net motor field excitation remaining is just sufficient to provide the necessary motor torque to drive the connected load, at which point the speed is maintained substantially constant by the differential action of the separate excitations for the motor field windings.

To stop the system, the Stop push button is pressed. This immediately deenergizes the relay R which closes its back contact members of the transfer contact R4 to energize the brake relay B. This relay at its contact members B1 and B2 reverses the application of the constant voltage to the bridge terminals. At the same time, the relay B opens its contact members B3 to deenergize the voltage relay VR, thus disconnecting the bridge circuit from the motor armature terminals. The excitation of the motor field windings is thus again increased to the maximum value and reversed to thereby provide regenerative braking of the motor. The contact members B4 in the energizing circuit for the relay R open. As the motor speed decreases, the sped responsive switch S opens its contact members. Since the front contact members of the transfer contact R4 which this speed switch shunts are now open, the circuit to the coil of the accelerating relay is opened, and the accelerating relay drops out. This opens the contact members A2 which normally shunt the contact members R5 of the run relay, and since these contact members are now open, the coil of the circuit breaker CB is deenergized. The circuit breaker shunts the motor armature and its series resistor at the contacts CB1 and opens the circuit to the coil of the brake relay B at the contacts CB2. As a result, the brake relay is deenergized, and the motor completely deenergized.

The embodiment of the invention illustrated in Fig. 4 of the drawings in a manner similar to Fig. 1 utilizes a pilot generator to obtain a voltage which varies according to the motor speed. The output terminals of the pilot generator are connected through the medium of the voltage relay VR across two terminals of the electrical bridge circuit such that the pilot generator output energizes the bridge in opposition to that provided by the constant voltage conductors through the medium of the run relay R. This arrangement provides a more accurate indication of the motor speed since the generated voltage does not depend upon the motor armature currents which are subject to slight variations. The single field winding of the pilot generator is connected directly across the constant voltage conductors. Thus, the excitation of this single field is maintained at a constant value and an electrical quantity generated in the armature indicative of the speed. The system otherwise is the same as that illustrated in Fig. 3. Hence, a further description thereof is believed unnecessary.

If constant torque acceleration and braking is not desired the relays VR and B may be eliminated from the system. On acceleration the variable voltage now directly applied to the bridge would continuously reduce the motor field excitation and so vary the torque. On deceleration the variable voltage would decrease and so decrease the decelerating torque as the motor speed decreases.

The foregoing disclosure and the showings made in the drawings are merely illustrative of the principles of this invention and are not to be interpreted in a limiting sense. The only limitations are to be determined from the scope of the appended claims.

I claim as my invention:

1. In an electric drive, the combination of, a motor having an armature winding and a pair of field windings, means for producing a constant electrical current for energizing the armature winding of said motor, an electrical bridge circuit having four terminals, said pair of field windings for the motor being connected in opposite legs of said bridge circuit, means for producing an electrical potential of constant value connected across two terminals of said bridge circuit, and means for producing a potential varying in magnitude according to the speed of said motor, connected across the remaining two terminals of said bridge circuit such that said variable potential is in opposition to said constant potential.

2. In an electric drive, the combination of, a motor having an armature winding and a pair of field windings, means for producing a constant electrical current for energizing the armature winding of said motor, an electrical bridge circuit having four terminals, said pair of field windings for the motor being connected in opposite legs of said bridge circuit, means for producing an electrical potential of constant value, connected to two terminals of said bridge circuit, means for producing an electrical potential varying depending upon the speed of the motor, and means for connecting the variable potential producing means to the remaining two terminals of the bridge circuit when said variable potential reaches a predetermined value, said variable potential being applied in opposition to said constant potential.

3. In an electric drive, the combination of, a motor having an armature winding and a pair of field windings, means for producing a constant electrical current for energizing said armature winding, an electrical bridge circuit having four terminals, said pair of field windings being connected in opposite legs of the electrical bridge circuit, means for producing an electrical potential of constant value, connected to two terminals of the electrical bridge circuit, means for producing an electrical potential of a value according to the counter voltage of the motor, means for connecting said last mentioned means to the remaining two terminals of said bridge circuit when said counter voltage reaches a certain value, said connection being in opposition to said constant potential connection, means for reversing the connections of said constant potential producing means to said bridge circuit, said connection reversing means being effective to disconnect said means for producing an electrical potential according to the motor speed from said bridge circuit, and means for completely deenergizing said motor when the motor speed reaches a predetermined low value.

4. In an electric drive, the combination of, a motor having an armature winding and field winding means, means for producing a constant electrical current, means for producing a constant electrical potential, means for producing a variable electrical potential which varies according to the speed of the motor, means for energizing the motor armature with said constant electrical current, means for applying said constant electrical potential to said field winding means, an electromagnetic relay responsive to said variable electrical potential for applying said variable electrical potential to said field winding means in opposition to said constant potential when said variable electrical potential reaches a certain value, means for reversely applying said constant electrical potential to said field winding means and removing the application of said variable electrical potential from said field winding means independently of said means for applying the variable electrical potential, and a motor speed responsive switch for effecting complete deenergization of said motor when the motor speed reaches a certain low value.

5. In an electric drive, the combination of, a motor having an armature winding and field winding means, a resistor in series with said armature winding, an acceleration relay for shunting said resistor upon energization thereof, a contactor normally shunting said armature winding and resistor which contactor when energized removes said shunt, means for producing a constant electrical current connected in circuit with said motor armature and resistor, means for producing a constant electrical potential, a run relay which when energized connects said means for producing a constant electrical potential to said field winding means to effect normal running operation of said motor, a brake relay which when energized reversely connects said means for producing a constant electrical potential to said field winding means, means including electrical interlocks for the run and brake relays for selectively operating said relays over a complete cycle of operation of the motor, means for producing a variable electrical potential which varies according to the counter voltage of the motor, a voltage relay for connecting the means for producing a variable electrical potential to said field winding means in opposition to said constant potential as applied by said run relay, when said variable potential reaches a certain value, means forming a part of said brake relay for deenergizing the voltage relay upon operation of the brake relay, means for energizing the run relay, means forming a part of the run relay for energizing said contactor, means forming a part of said run relay and said contactor for energizing said accelerating relay, means forming a part of the accelerating relay for maintaining said contactor energized when the run relay is deenergized, a switch responsive to the speed of operation of the motor for maintaining the accelerating relay energized independently of the run relay until the speed of said motor reaches a certain low value, means for deenergizing the run relay, means forming a part of the run relay and operable upon deenergization thereof to energize said brake relay, said switch opening at said certain low motor speed to deenergize the accelerating relay, thereafter said contactor and brake relay drop out in the sequence named.

GEORGE E. KING.

REFERENCES CITED

The following references are of record in the file of this patent:

UNITED STATES PATENTS

| Number | Name | Date |
| --- | --- | --- |
| 591,345 | Dunn | Oct. 5, 1897 |
| 1,931,111 | Goldberg | Oct. 17, 1933 |
| 2,255,064 | King | Sept. 9, 1941 |